March 9, 1965     R. C. MACKEY     3,172,580
SUGAR DISPENSERS
Filed April 16, 1964
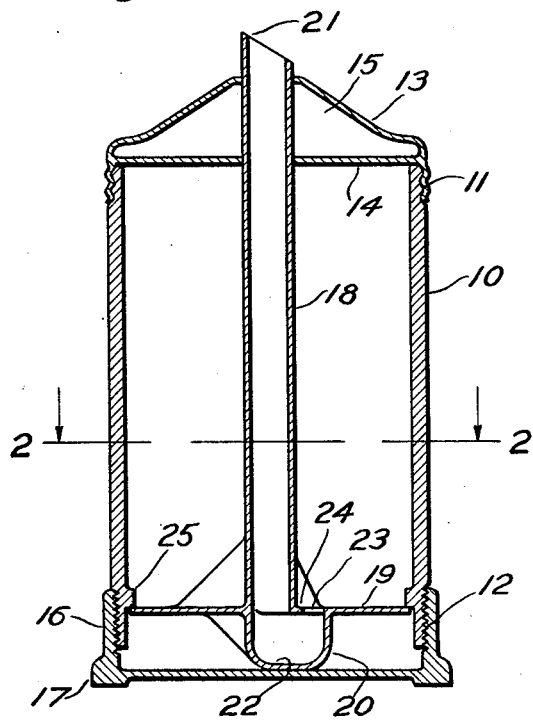
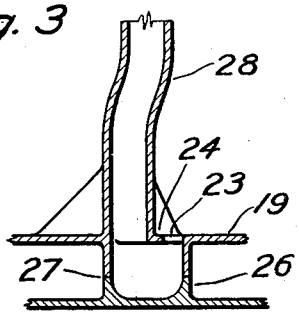
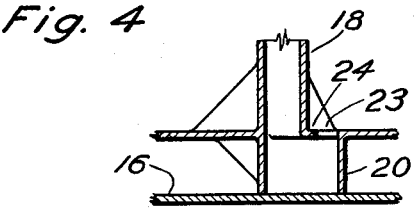
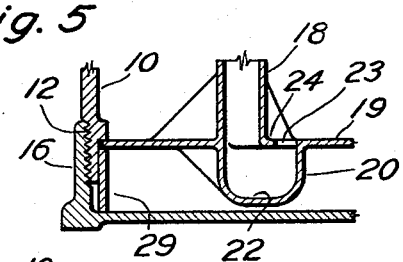
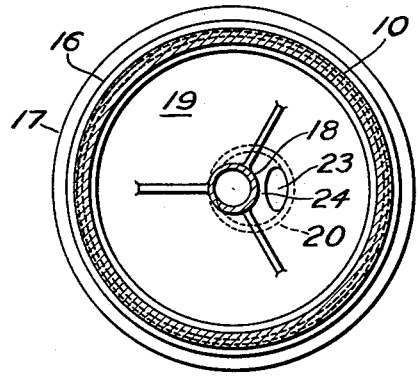
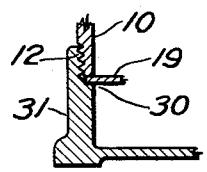
Richard C. Mackey
INVENTOR.
BY John Walker
AGENT

United States Patent Office 3,172,580
Patented Mar. 9, 1965

3,172,580
SUGAR DISPENSERS
Richard C. Mackey, 108 Campbell Ave., Antioch, Calif.
Filed Apr. 16, 1964, Ser. No. 360,296
5 Claims. (Cl. 222—456)

This invention relates to containers for the dispensing of sugar in prefixed quanities, and is an improvement upon the design of container as disclosed in my U.S. Patent No. 2,423,784.

Prior to the introduction of my design of dispenser, as shown on the above patent, devices of the kind then available, when subjected to conditions usually encountered in normal use, such as having the sugar outlet placed in close proximity to, and in the path of the vapor rising from a cup of hot liquid, were soon rendered unserviceable by the action of the vapor. The traps or pockets, from which the sugar was emptied during use, being located at or near the top of the container, were found to be incapable of preventing the ingress of moisture, and as a result, the sugar would adhere to the surface of the trap and around the pouring outlet, resulting in maloperation of the device.

While the dispenser under discussion overcame the main objection to devices of this kind, as outlined above, certain other disadvantages were found to be inherent in my original design. The relative positions of the trap and the bottom of the container make it impossible to completely empty the dispenser by normal operation of the device. Also, in order to refill the container, it becomes necessary to remove the trap and the attached delivery tube, resulting in their being subjected to conditions of contamination, breakage or other undesirable contingency.

It is the principal object of the present invention to provide a dispenser which will continue to operate satisfactorily at any and all times while containing sugar to be dispensed.

It is a further object of the invention to provide a device of the class described that can be readily cleaned and maintained in a perfectly sanitary condition.

Another object of the invention is the provision of a dispenser which can be completely emptied prior to the need for refilling.

These and other objects of the invention will become apparent during the course of the following description and appended claims taken in connection with the accompanying drawing forming a part hereof.

In the drawing:

FIGURE 1 is a transverse section taken on a vertical median line of my improved dispenser which illustrates a preferred embodiment thereof.

FIGURE 2 is a transverse horizontal section taken on line 2—2 of FIGURE 1.

FIGURE 3 is a fragmentary sectional detail showing a modified construction of the pocket or trap which controls the amount of sugar to be dispensed at each using.

FIGURE 4 is a further modification of the detail as described for FIGURE 3.

FIGURE 5 delineates, in fragmentary sectional detail, an alternate method of securing the trap and the delivery tube.

FIGURE 6 illustrates a still further means of assembling the components shown in FIGURE 5.

Referring to the drawing in detail, a container 10 of substantially hollow cylindrical form is indicated, the top and bottom ends of which are provided with screw threads as illustrated. In the preferred embodiment of the device as shown on FIGURE 1, the threads at the upper end of the container 10 have been shown to be of a form which is conventional with this type of manufacture. The threads 12, at the bottom of the container 10, are of the standard V or Seller's form. It will be understood however, that this showing is not intended to limit the construction of the invention in any manner, as other methods of securing the elements of the device may be utilized in the manufacture thereof, as may be found to be more expedient.

A lid or closure 13 is provided for the dispenser, which may be of generally conventional form as illustrated, or of other shape as personal esthetic taste may dictate. A departure from the usual design of closure of this type, however, is found in the provision of an inner wall or diaphragm 14, which, being spaced apart from the upper portion of the lid, forms an insulating space 15 as indicated. This space 15 forms an effective moisture barrier and therefore contributes to the continued trouble-free use of the container.

As can be seen in FIGURE 1, a bottom closure 16 of generally conventional screw cap form has been provided. This cap or closure is formed with a slightly outwardly and downwardly protruding ridge 17, thereby forming a base for the container as a whole. In addition to forming a base for the dispenser and a means of closing the bottom thereof, the closure 16 also serves to securely hold in place, an integral unit comprising a delivery tube 18, a false bottom 19, and a sugar receiving pocket or trap 20. The sugar dispensing conduit or tube 18 is axially located relative to the container 10. It extends upwardly through centrally located and aligned apertures in the diaphragm 14 and the lid 13, and is maintained in its aligned position by virtue of the closeness of the fit of the contiguous surfaces of these elements. The relatively short extending portion of the tube 18 is terminated by being cut at an angle of approximately 45 degrees to its axis, thereby forming a lip 21 which facilitates the pouring of sugar from the dispenser in the desired manner.

The lower end of the tube 19 terminates at its junction with the false bottom 19 which is in the form of a relatively thin circular flange, integral and concentric with said tube. The trap 20, which is integral with, and depends from, the underside of the false bottom 19, is in the form of a relatively small and shallow container of annular horizontal cross section; provided with a bottom wall 22 blending smoothly into the side walls of the trap by virtue of its concave inner surface as indicated. This form of interior ensures that the trap will be completely refilled after each time the dispenser is made use of, as the sugar will freely flow into place without any tendency to form air pockets as would otherwise be the case. It will be noted from FIGURES 1 and 2 that the tube 18 communicates with the trap 20, and further, that they are in special alignment in order to secure optimum performance. The smaller circle formed by the bore of the tube 18 is contained within the larger circle formed by the interior wall of the trap 20, however, the circles are tangent to one another, as can be seen on FIGURE 2. It should also be noted that the lip 21 of the tube 18 and the point of tangent of the aforementioned circles are in radial alignment relative to the median line of the container 10 and the center of the false bottom 19. This particular arrangement of trap and tube ensures a minimum of obstruction to the free flow of sugar from the former to the latter.

An elongated aperture 23 in the false bottom 19 provides for access from the container 10 into the trap 20. This aperture is shown as being elliptical in form, having its outer edge coinciding with the interior wall of the trap 20, and having its inner edge located between said inner wall of the trap and the outer wall of the tube 18, thus forming a lip 24 extending outwardly from the bottom of said tube. The center of the tube 18, the center of the trap 20 and the minor axis of the aperture 23 are in vertical coplanar relationship.

A relatively narrow shoulder 25, extending inwardly from the interior wall of the container 10, adjacent the bottom thereof, is provided to position the false bottom 19 and its attached elements within the said container. In the embodiment as disclosed by FIGURE 1, the entire assembly of container, tube, trap, false bottom and base is achieved by merely screwing the base into place, as the upper side of the bottom wall of the base 16 is designed to bear against the underside of the bottom wall 22 of the trap 20, and maintain the false bottom 19 in sealing relationship with the shoulder 25 of the container 10.

Two modifications of the trap arrangement have been indicated by FIGURES 3 and 4. In each of these designs, the trap can be opened from the bottom, thereby facilitating the cleaning of same. As shown in FIGURE 3, the lower part 26 of the trap has been made integral with the base of the container, a butt joint being indicated at 27. While this design retains all the free flowing characteristics of the one piece trap, it necessitates an offset 28 being provided in the tube 18, as obviously the assembly of the elements of this design requires that the trap, the base and the upper portion of the tube be in axial alignment.

FIGURE 5 illustrates a method of locking the tube, trap and false bottom assembly in place by the provision of a spacer ring 29, the use of which makes it possible to dispense with the contact between the trap and the base. This same condition can be accomplished as shown in FIGURE 6 wherein the shoulder 25 of the container 10 has been dispensed with, and the false bottom 19 is held in place between the bottom edge of the container 10, and an inwardly projecting shoulder 30 provided on a modified base 31.

From the foregoing description, it will be apparent that I have provided a dispenser of the type described that will repeatedly measure out an identical amount of sugar at each use. The amount will be established by the size of the trap, and normally, will be equal to one teaspoonful. Reference being made to FIGURE 1 of the drawing, it will be apparent that, with sugar in the container and with the container standing in an upright position as indicated, the trap will always be full. As the container is tipped over with the lip of the tube leading, or in a counterclockwise direction as seen on the drawing, a laminar flow of sugar will occur at two places. The sugar in the container proper will begin to flow from the top corner remote from the lip of the tube and will move toward the opposite corner flowing in strata at an angle slightly greater than the angle of repose. A similar condition will take place inside the trap. As the delivery tube is empty after each use, there will be nothing to impede the free flow of sugar from the trap into said tube. No flow will take place, however, from the trap through the feed aperture into the container, as the sugar in that zone immediately adjacent said aperture will not have been displaced before the container is tilted to an angle such that it would not be possible for normal flow to take place in that direction, and the level in the trap having by then dropped below the edge of the lip 24. At this point, all of the flow of sugar will be away from the feed aperture, it should be apparent therefore, that with each use of the dispenser, an identical amount of sugar will be discharged regardless of any other conditions.

Moisture from the liquid being sweetened presents no problem, in fact the contents of the dispenser are afforded additional protection from humid conditions by the provision of insulating spaces both at the top and bottom of the device.

The dispenser can be made from either transparent or opaque plastic materials, or metal, or a combination of each as may be deemed most expedient or desirable. I have illustrated and described a preferred embodiment of my invention, it will be understood however, that further modifications may be made, such as the construction of the filler cap 13 in other than integral form. Such changes or modifications may be necessitated by current practice in manufacturing methods, but will still be considered as falling within the spirit and scope of the appended claims.

I claim:

1. A sugar dispenser comprising a container open at the top and open at the bottom, a lid for said container having a centrally disposed aperture therein, a bottom closure for said container adapted to form a base, a false bottom adjacent the lower end of said container being spaced a relatively short distance above said base and having a centrally disposed aperture therein, a delivery tube axially mounted within said dispenser, the upper end of said tube being contained within the aperture of said lid and protruding a relatively short distance therefrom, the lower end of said tube terminating at the said false bottom and being in alignment with the aperture therein, a trap depending from said false bottom and being in communication with said delivery tube and also being in communication with said container, the lower portion of said trap being integral with said base, said false bottom being provided with a second aperture located exteriorly of said tube and interiorly of said trap.

2. A sugar dispenser comprising a container open at the top and open at the bottom, a lid for said container having a centrally disposed aperture therein, a bottom closure for said container adapted to form a base, a false bottom adjacent the lower end of said container being spaced a relatively short distance above said base and having an eccentrically disposed aperture therein, a delivery tube mounted within said dispenser, the upper end of said tube being in axial alignment with, and being contained within the aperture of said lid and protruding a relatively short distance therefrom, the lower end of said tube being offset from the upper end thereof and terminating at the said false bottom and being in alignment with said eccentrically disposed aperture therein, a trap depending from said false bottom in concentric alignment therewith and being in communication with said delivery tube and also being in communication with said container, said false bottom being provided with a second aperture located exteriorly of said tube and interiorly of said trap.

3. A sugar dispenser comprising a container open at the top and open at the bottom, a lid for said container having a centrally disposed aperture therein, a bottom closure for said container adapted to form a base, a false bottom adjacent the lower end of said container being spaced a relatively short distance above said base and having a centrally disposed aperture therein, a delivery tube axially mounted within said dispenser, the upper end of said tube being contained within the aperture of said lid and protruding a relatively short distance therefrom, the lower end of said tube terminating at the said false bottom and being in alignment with the aperture therein, a trap depending from said false bottom and being in communication with said delivery tube and also being in communication with said container, said false bottom being provided with a second aperture located exteriorly of said tube and interiorly of said trap, and said tube, said false bottom and said trap being maintained in place by contact between the upper surface of the bottom of said base, and the lower surface of the bottom of said trap.

4. A sugar dispenser comprising a container open at the top and open at the bottom, a lid for said container having a centrally disposed aperture therein, a bottom closure for said container adapted to form a base, a false bottom adjacent the lower end of said container being spaced a relatively short distance above said base and having a centrally disposed aperture therein, a delivery tube axially mounted within said dispenser, the upper end of said tube being contained within the aperture of said lid and protruding a relatively short distance therefrom, the lower end of said tube terminating at the said false bottom and being in alignment with the aperture therein, a trap depending from said false bottom and being in communication with said delivery tube and also being in communication with said container, said false bottom being provided with a second aperture located exteriorly of said tube and interiorly of said trap, and said tube, said false bottom and said trap being maintained in place by contact between the outer edge of said false bottom and the vertical wall of said base.

5. A sugar dispenser comprising a container open at the top and open at the bottom, a lid for said container having a centrally disposed aperture therein, a bottom closure for said container adapted to form a base, a false bottom adjacent the lower end of said container being spaced a relatively short distance above said base and having a centrally disposed aperture therein, a delivery tube axially mounted within the dispenser, the upper end of said tube being contained within the aperture of said lid and protruding a relatively short distance therefrom, the lower end of said tube terminating at the said false bottom and being in alignment with the aperture therein, a trap depending from said false bottom and being in communication with said delivery tube and also being in communication with said container, said false bottom being provided with a second aperture located exteriorly of said tube and interiorly of said trap, and said tube, said false bottom and said trap being maintained in place by contact between the outer edge of said false bottom and an annular spacer ring contained within said base.

References Cited by the Examiner
UNITED STATES PATENTS

| 1,845,981 | 2/32 | Land | 222—456 |
| 2,423,784 | 7/47 | Mackey | 222—456 |
| 2,747,776 | 5/56 | Hentschke et al | 222—456 |

RAPHAEL M. LUPO, *Primary Examiner.*

LOUIS J. DEMBO, *Examiner.*